June 23, 1931.  C. HOLLERITH  1,811,673
BELT GEARING
Filed March 12, 1930
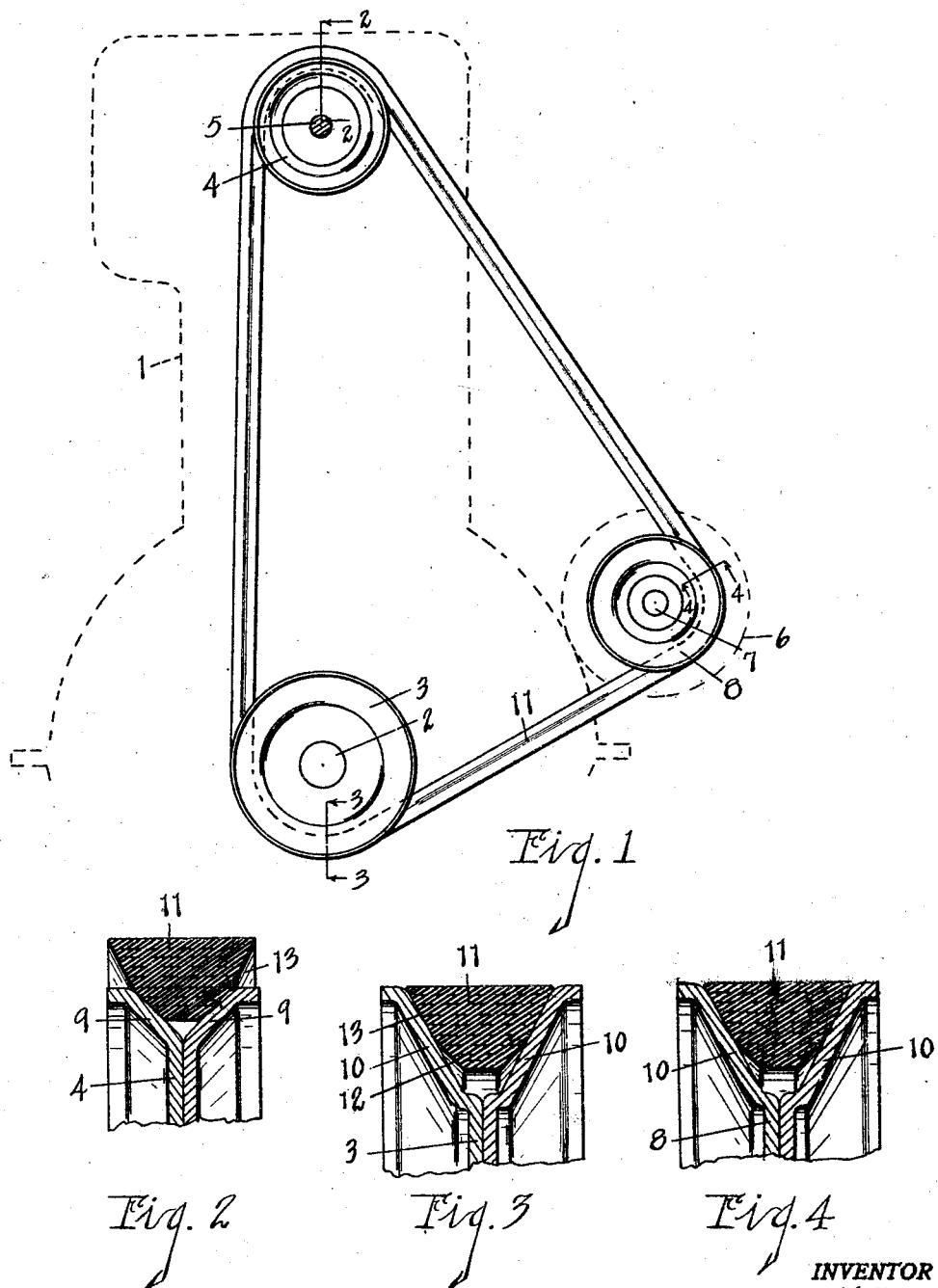

Patented June 23, 1931

1,811,673

UNITED STATES PATENT OFFICE

CHARLES HOLLERITH, OF JACKSON, MICHIGAN, ASSIGNOR TO AUTOMOTIVE FAN & BEARING COMPANY, OF JACKSON, MICHIGAN

BELT GEARING

Application filed March 12, 1930. Serial No. 435,080.

In the belt drives or gearings for fans and generators of internal combustion engines employed on locomotive vehicles excessive speed of the fan is objectionable as it is likely to result in noise. Attempts have heretofore been made to overcome this by permitting slippage of the belt on the fan pulley at high speeds, but where this is accomplished by loosening the belt it is likely to result in slippage of the belt on its generator pulley, which is also commonly employed to drive the pump, and this is very undesirable.

It is the main object of this invention to provide a belt drive or gearing which will permit slipping on the fan pulley without affecting the drive on the generator pulley.

Objects pertaining to details and economies of my invention will definitely appear from the description to follow. The invention is defined in the claims.

A structure which embodies the features of my invention is clearly illustrated in the accompanying drawings, in which:

Fig. 1 is a fragmentary front elevation of a structure embodying the features of my invention, portions of an internal combustion engine being indicated by dotted lines, the fan spindle being shown in section, and the fan omitted.

Fig. 2 is an enlarged fragmentary section on line 2—2 of Fig. 1 showing details of the fan pulley.

Fig. 3 is a detail section on a line 3—3 of Fig. 1 showing details of the driving pulley.

Fig. 4 is a detail section on line 4—4 of Fig. 1 showing details of the generator pulley.

Referring to the drawings, 1 represents an internal combustion engine and 2 the crank shaft thereof. On this crank shaft is a flanged driving pulley 3. The fan pulley 4 is also a flanged pulley. The fan spindle is indicated at 5 and the fan is omitted.

The generator is indicated by the dotted lines 6 and is provided with a shaft 7 having a pulley 8 thereon.

The flanges 9 of the pulley 4 are disposed at a substantially greater angle than are the flanges 10 of the pulleys 3 and 8 which, in the structure illustrated, are disposed at the same angle.

The belt 11 is of general tapered cross section having inner portions 12 of its side walls disposed at an angle corresponding to the angle of the flanges of the pulley 4 so as to fit therein, as shown in Fig. 2. The side walls of the belt have outer portions 13 disposed at an angle corresponding to the angle of the flanges of the pulleys 3 and 8. The result is that there is a substantially greater amount of friction or gripping engagement between the belt and the pulleys 3 and 8 than there is between the belt and the fan pulley 4, so that, while some slippage is permitted between the fan pulley and the belt, there is under the same condition of tautness of the belt no slippage between the belt and the generator pulley or the driving pulley.

While a belt of tapered cross section is preferred, a belt of circular or other cross section may be employed quite satisfactorily.

I have not attempted to illustrate or describe various adaptations of my improvements as it is believed that this disclosure will enable those skilled in the art to adapt or embody the same as may be desired.

Having thus described my invention what I claim as new and desire to secure by Letters Patent is:

1. The combination with an internal combustion engine, of a flanged driving pulley, a flanged fan pulley and a flanged generator pulley, the flanges of the fan pulley being disposed at an angle greater than that of the flanges of the driving and generator pulleys, and a belt of tapered cross section coacting with said pulleys, the side walls of the belt having inner portions disposed at an angle corresponding to the angle of the fan pulley and outer portions corresponding to the angle of the flanges of the generator pulley.

2. The combination with an internal combustion engine, of a flanged driving pulley, a flanged fan pulley and a flanged generator pulley, the flanges of the fan pulley being disposed at an angle greater than that of the flanges of the driving and generator pulleys, and a belt coacting with said pulleys.

3. The combination of a flanged driving pulley, a pair of flanged driven pulleys, the flanges of one of said driven pulleys being disposed at an angle greater than that of the other driven pulley, and a belt of tapered cross section, the side walls of the belt having inner portions disposed at an angle corresponding to the angle of the pulley having the greater angle and outer portions corresponding to the angle of the flanges of the other driven pulley.

4. The combination of a flanged driving pulley, a pair of flanged driven pulleys, the flanges of one of said driven pulleys being disposed at an angle greater than that of the other driven pulley, and a belt of tapered cross section.

5. The combination of a driving pulley and a pair of flanged driven pulleys, the angle of the flanges of one of said pulleys being greater than the angle of the flanges of the other pulley, and a belt of tapered cross section coacting with said pulleys.

6. The combination of a driving pulley and a pair of flanged driven pulleys, the angle of the flanges of one of said pulleys being greater than the angle of the flanges of the other pulley, and a belt coacting with said pulleys.

In witness whereof I have hereunto set my hand.

CHARLES HOLLERITH.